Patented May 19, 1942

2,283,276

UNITED STATES PATENT OFFICE 2,283,276

PHOTOGRAPHIC COMPOSITION CONTAINING ARYLIDES OF N-HETEROCYCLIC ACYLACETIC ACIDS AND PROCESS OF DEVELOPING PHOTOGRAPHIC IMAGES THEREWITH

Edmund B. Middleton, Metuchen, and Andrew B. Jennings, New Brunswick, N. J., assignors, by mesne assignments, to E. I. du Pont de Nemours & Company, Wilmington, Del., a corporation of Delaware No Drawing. Application January 25, 1939, Serial No. 252,818

12 Claims. (Cl. 95—6)

This invention relates to color photography. More particularly it relates to color-former compounds which are useful in photographic emulsions and developers for producing colored images. The invention also relates to photographic elements bearing emulsion layers which develop to form metallic silver and dyes in admixture with each other.

This invention has for an object to provide new photographic color-former agents of improved spectral quality. A further object is to provide novel color-formers which couple readily upon development in colloidal emulsions to form water insoluble immobile dyes in situ with photographic images. A still further object is to provide novel color-formers which will form dyes with the oxidation products of aromatic amino developing agents or the corresponding nitroso compounds upon development of photographic images. A still further object is to provide novel color formers which do not adversely effect the sensitivity of photographic emulsions, particularly gelatine silver halide emulsions. Still other objects will be apparent from a consideration of the hereinafter described invention.

Some of the above and other objects are accomplished by the preparation and use of compounds having the general formulae:

(1) 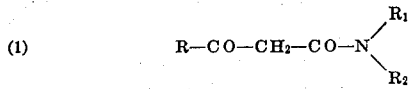

and (2)    R—CO—CH$_2$—CO—OR$_3$ wherein R is a N-heterocyclic radical which is attached to the —CO radical in the alpha, beta or gamma position thereof, R$_1$ is a member of the group consisting of hydrogen and hydrocarbon radicals, R$_2$ is a member of the group consisting of aryl and azole radicals, and R$_3$ is a hydrocarbon radical.

Thus, R may be a pyridine, quinoline, etc. nucleus, which may be substituted by various groups. Thus, various groups which change the shade or color may be used as substituents. Suitable substituents include halogen, e. g. chlorine, bromine, etc., alkyl, e. g. methyl, ethyl, isopropyl, hexyl, dodecyl, etc., alkoxy, e. g. methoxy, ethoxy, propoxy, etc. The mononuclear radicals such as picolinoyl, nicotinoyl and isonicotinoyl and their substitution products are particularly useful and result in improved color-formers. Of these the picolinoyl type are preferred.

R$_1$ in the above formula may be hydrogen, normal, iso- or branched chain alkyl, e. g. ethyl, methyl, propyl, butyl, octyl, cetyl, etc.; aryl, e. g. phenyl, chlorphenyl, $\alpha$-naphthyl, $\beta$-naphthyl, etc., which may be substituted; R$_3$ has the same significance as R$_1$ and in addition may be cycloalkyl, e. g. cyclohexyl, methanyl, abietyl, naphthenyl, etc.

The compounds of Formula 2 may be prepared by reacting the lower alkyl esters of the pyridine or quinoline carboxylic acids such as the ethyl and methyl esters with the corresponding acetic acid ester in inert organic solvent medium in the presence of an alkali metal and a lower monohydric aliphatic alcohol, e. g. methyl, ethyl and isopropyl or the corresponding alcoholates. The esters are recovered by diluting with water, neutralizing, and extracting with an organic solvent. The esters may then be reacted with an equimolecular equivalent of an aromatic amine to form the compounds of Formula 1 in an organic solvent medium. Suitable organic solvents include benzene, toluene and the xylenes. The resulting substituted amides are recrystallized from alcohol or ether, etc.

The above-described class of coupling components or color-formers may be incorporated in a photographic emulsion or may be added to a developer solution. In the event that their solubility is not very good they may be finely divided and dispersed with the aid of dispersing agents, if necessary. They may also be used in conjunction with the usual cyanine, carbocyanine, pseudocyanine, cyazine, carbocyazine salts and bases which are used to extend the sensitivity of silver halide emulsions.

The invention will be further illustrated but is not intended to be limited by the following examples, the first two of which are illustrative of the new class of pyridylacyl amides.

Example I

One molecular equivalent of ethyl picolinoyl acetate was reacted with 0.9 molecular equivalent of paratoluidine in the presence of xylene while maintaining the reaction medium at about the boiling point of the latter for a period of two hours. The solution was concentrated and allowed to cool, whereupon an amide having the formula:

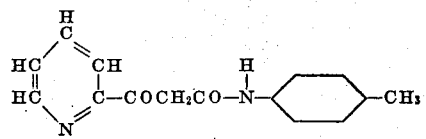

crystallized out. The product was recrystallized from dry alcohol and had a melting point of 118 to 119° C. By substituting p-laurylaniline for the p-toluidine, an amide which was a semi-crystalline liquid was obtained.

*Example II*

One molecular equivalent of ethyl picolinoyl acetate was reacted with 2,5-diethoxyaniline in a manner similar to that described in Example I, to form an amide having the formula:

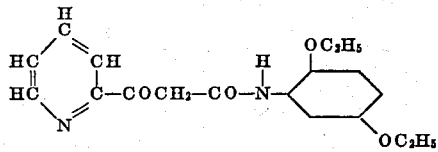

The product after recrystallization had a melting point of 112–112.5° C.

Upon substituting 2-amino-6 phenyl benzothiazole for the p-toluidine of Example I, an amide having a melting point of 160° C. was formed. Similarly, by substituting 2.5-dichloroaniline and benzidine amides having melting points of 124–125° C. and 235–237° C., respectively were formed.

In place of the specific amines set forth above may be substituted a large number of other amines. Suitable amines include:

p-Aminophenyl morpholine
p-Anisidine
p-Phenetidine
p-Chloro-aniline
Alpha naphthylamine
Beta-naphthylamine
Dianisidine
Tolidine
p-Aminophenyl piperidine
p-Amino dimethyl aniline
Benzoyl-p-phenylenediamine
p-Phenylenediamine
N-ethyl-N-benzyl-p-phenylenediamine
N-ethyl-N-phenyl-p-phenylenediamine
2,5-dimethyl aniline
4-chloro-2,5-dimethyl aniline
2,3,5,6-tetramethyl aniline
2-chloro-5-methyl aniline
m-Toluidine
3-bromo-4-methyl aniline
3-nitro-4-methyl aniline
2,5-diethoxy-4-chloro-aniline
2,5-dimethoxy-4-chloro-aniline
2,5-diethoxy-4-furoylamine aniline
3-benzoylamino-4-methoxy aniline
4-benzoylamino-3-methoxy aniline
5-bromo-2-methoxy aniline
o-Phenoxy aniline
2,5-diethoxy-4-nitro aniline
m-Nitro aniline
p-Nitro aniline
p-Phenoxy aniline
o-Chloro aniline
p-Aminophenyl-benzyl ether
4-chloro-2-methoxy-5-isopropyl aniline
p-Fluoro-aniline
2-nitro-4,6-dimethyl aniline
2-amino benzoyl-o-toluidine
p-Amino benzoyl-2-amino benzothiazole
2-methoxy-4-nitro aniline
3,3'-dimethyl-4,4'-diamino diphenyl-6,6' sulfone
p-Amino-p'-hydroxy-azobenzene
4-acetoacet-amino-4'-amino-diphenyl
Hexamethylenediamine
Benzylamine
Decamethylenediamine

*Example III*

To 100 ccs. of 2% by weight aqueous gelatine solution is added a solution consisting of 8 ccs. of ethyl alcohol and 1.5 grams of picolinoylacet-p-toluidide together with a 20% aqueous caustic soda solution in an amount equal to 1 mol of alkali for each mol of the compound. The total weight of the combined solution is brought to about 150 grams with water and then the mixture is added to 100 grams of a gelatino-silver halide emulsion and mixed thoroughly. The resulting emulsion may then be coated upon a suitable support such as paper, glass or cellulose derivative base or upon another photographic emulsion layer which may or may not contain another color-forming dye component. After exposure in a camera or by printing through appropriate color records, the film is developed by means of an alkaline solution of diethyl-p-phenylenediamine whereupon a light yellow dye of good strength and color forms. Or the film may be first developed in a black and white developer, re-exposed and developed as indicated.

The amides prepared from ethyl picolinoyl acetate and 2,5-dichloroaniline, 2,5-diethoxyaniline, benzidine, p-dodecylaniline and 2-amino-6-phenylbenzothiazole may be substituted for the specific amide of Example III to form other yellow dyes of good strength and color, which are insoluble and immobile.

*Example IV*

One gram of ethyl picolinoylacetate in 8 ccs. of ethyl alcohol is added to 100 ccs. of 2% by weight of aqueous gelatin solution the total weight is then brought to 150 grams with water and the mixture is added to 100 grams of a gelatino-silver chloride emulsion and mixed thoroughly. The resulting emulsion may then be coated upon a suitable photographic support after the manner described in Example III. After exposure the photographic element is developed in an alkaline solution containing diethyl-p-phenylenediamine, whereupon a yellow dye of good tinctorial strength is formed. A reversal process such as that described in Example III may be employed if desired.

In place of ethyl picolinoyl acetate may be substituted any of the herein described esters of picolinic, nicotinic, isonicotinic and quinoline carboxylic acids.

*Example V*

To 100 ccs. of a developer having the following composition:

Diethyl-p-phenylene diamine hydrochloride
_____g__  2
Sodium sulfite (anhydrous)_____g__  5
Sodium carbonate (anhydrous)_____g__ 20
Water _____cc__ 1000 are added from 0.1 to 1.0 gram of picolinoyl-acetanilide dissolved in a few ccs. of anhydrous ethyl alcohol. A photographic element containing exposed silver salts is then developed in aforementioned solution.

A positive silver image which has been bleached to a silver salt image may be redeveloped in this solution. A suitable bleach may comprise a liter of water containing about 35 grams of potassium ferricyanide and 5 ccs. of 20% ammonia water. Thorough washing between treatments is essential. After color-development, the silver may be removed, leaving a pure dye image, by bleaching in ferricyanide for example, and fixing in plain hypo. In place of the specific anilide of this example may be substituted any of the amides or esters herein described.

The silver halide emulsions above-described may form a single layer of a photographic element or may form one of a plurality of layers which may or may not contain another color-forming dye component. Alternatively, the silver halide emulsion may be coated on a plain or colored separating layer as one sensitive layer of a series of such layers on a monopack, multi-layered film for use in color photography.

The photographic emulsions and emulsion layers may also contain the usual sensitizers such as the cyanine and carbocyanine salts and bases and the cyazines and carbocyazine salts and bases employed to extend the sensitivity of photographic emulsions.

In place of the specific aromatic amino developing agents of the above examples, others which may be used are the mono-, di-, and tri-amino aryl compounds. The diamino aryl compounds such as para-phenylenediamine and its substitution products are preferred. These developers may be substituted in the amino groups as well as in the ring, preferably the former, to constitute compounds such as the alkyl arylenediamines, including the alkyl naphthylenediamines, alkyl phenylenediamines and alkyl toluylenediamines. The compounds, of course, must have one free or unsubstituted amino group which enables the oxidation product of the developer to couple with the color-forming compounds. As examples of developers of the class described, there may be mentioned p-phenylenediamine, monoethyl-p-phenylenediamine, diethyl-o-phenylene diamine, chloro-p-phenylene-diamine, amino-p-phenylenediamine, 1,2,5 - toluene - diamine, 2-amino - 5 - diethylamino - toluene, p-aminophenylene-piperidine, methyl-oxyethyl-p-phenylenediamine, ethyl-oxyethyl-p-phenylenediamine, butyl-oxyethyl-p-phenylenediamine, 2-amino-5-oxyethyl-1-butylamino-toluene and its dihydrochloride, $\beta$-$\gamma$-dioxypropyl-p-phenylene diamine, etc. These compounds are preferably used in the form of their salts either of organic or inorganic type since they are more soluble and stable than the free bases. As examples of suitable salts, mention is made of the hydrochloride, sulfates, acetates, etc.

These color formers have the advantage that they form yellow images of good color quality and clarity. They are free from the brown tone coloration which is formed by prior art color formers.

As many apparently widely different embodiments of this invention may be made without departing from the spirit and scope thereof, it is to be understood that we do not limit ourselves to the specific embodiments herein except as defined by the appended claims.

We claim:

1. A photographic emulsion containing a light sensitive silver salt and a compound taken from the group consisting of the amides having the general formula

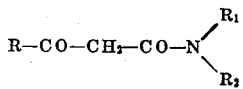

and esters having the general formula

R—CO—CH₂CO—OR₃ wherein R is an N-heterocyclic radical containing an unsaturated nucleus having one nitrogen atom and 5 carbon atoms in the hetero ring, one of said carbon atoms being attached to the carbonyl group, $R_1$ is a member of the group consisting of hydrogen and hydrocarbon radicals, $R_2$ is a member of the group consisting of aryl and azole radicals and $R_3$ is a hydrocarbon radical.

2. A photographic emulsion layer containing a silver halide and an amide having the general formula:

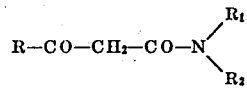

wherein R is an N-heterocyclic radical containing an unsaturated nucleus having one nitrogen atom and 5 carbon atoms in the hetero ring, one of said carbon atoms being attached to the carbonyl group, $R_1$ is a member of the group consisting of hydrogen and hydrocarbon radicals, and $R_2$ is a member of the group consisting of aryl and azole radicals.

3. A photographic emulsion layer containing a silver halide and an ester of the general formula:

R—CO—CH₂—CO—OR₃ wherein R is an N-heterocyclic radical and $R_3$ is a hydrocarbon radical containing an unsaturated nucleus having one nitrogen atom and 5 carbon atoms in the hetero ring, one of said carbon atoms being attached to the carbonyl group.

4. A color-forming photographic developer comprising a compound taken from the group consisting of the amides having the general formula

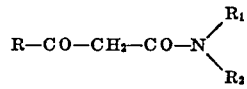

and esters having the general formula

R—CO—CH₂—CO—OR₃ wherein R is an N-heterocyclic radical containing an unsaturated nucleus having one nitrogen atom and 5 carbon atoms in the hetero ring, one of said carbon atoms being attached to the carbonyl group, $R_1$ is a member of the group consisting of hydrogen and hydrocarbon radicals, $R_2$ is a member of the group consisting of aryl and azole radicals and $R_3$ is a hydrocarbon radical; and an aromatic amino photographic developing agent.

5. The process which comprises developing a photographic image with an aromatic amino developing agent in the presence of a compound taken from the group consisting of the amides having the general formula

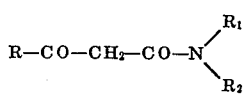

and esters having the general formula

R—CO—CH₂—CO—OR₃ wherein R is an N-heterocyclic radical containing an unsaturated nucleus having one nitrogen atom and 5 carbon atoms in the hetero ring, one of said carbon atoms being attached to the carbonyl group, $R_1$ is a member of the group consisting of hydrogen and hydrocarbon radicals, $R_2$ is a member of the group consisting of aryl and azole radicals, and $R_3$ is a hydrocarbon radical.

6. A photographic element bearing at least one silver halide emulsion layer containing an anilide of the general formula:

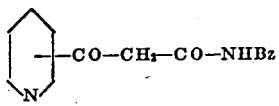

wherein Bz is a benzene nucleus.

7. An element as set forth in claim 6 wherein said anilide is picolinoylacet-2,5-diethoxy anilide.

8. An element as set forth in claim 6 wherein said anilide is a picolinoylacet amide of tolidine.

9. A layer as set forth in claim 6 wherein said ester is ethyl picolinoylacetate.

10. The process which comprises developing a photographic element bearing an emulsion layer containing a reducible silver halide image with an aromatic primary amino developing agent in the presence of picolinoylacet-2,5-diethoxy anilide.

11. The process which comprises developing a photographic element bearing an emulsion layer containing a reducible silver halide image with an aromatic primary amino developing agent in the presence of a picolinoylacet amide of tolidine as a color former.

12. The process which comprises developing a photographic element bearing an emulsion layer containing a reducible silver halide image with an aromatic primary amino developing agent in the presence of ethyl picolinoyl acetate as a color former.

EDMUND B. MIDDLETON.
ANDREW B. JENNINGS.

CERTIFICATE OF CORRECTION.

Patent No. 2,283,276.                                      May 19, 1942.

EDMUND B. MIDDLETON, ET AL.

It is hereby certified that error appears in the printed specification of the above numbered patent requiring correction as follows: Page 1, second column, line 6, for "methanyl" read --menthanyl--; page 3, second column, lines 27 and 28, strike out the words "and $R_3$ is a hydrocarbon radical" and insert the same after "group" and before the period in line 31, same claim; and that the said Letters Patent should be read with this correction therein that the same may conform to the record of the case in the Patent Office.

Signed and sealed this 28th day of July, A. D. 1942.

Henry Van Arsdale, (Seal)                                Acting Commissioner of Patents.